United States Patent
Yagi et al.

(10) Patent No.: US 8,212,982 B2
(45) Date of Patent: Jul. 3, 2012

(54) LIQUID CRYSTAL DISPLAY UNIT AND ELECTRONIC DEVICE

(75) Inventors: Keiichi Yagi, Kanagawa (JP); Yasuhiro Kanaya, Tokyo (JP)

(73) Assignee: Sony Corporation, Tokyo (JP)

( * ) Notice: Subject to any disclaimer, the term of this patent is extended or adjusted under 35 U.S.C. 154(b) by 99 days.

(21) Appl. No.: 12/637,830

(22) Filed: Dec. 15, 2009

(65) Prior Publication Data

US 2010/0157225 A1 Jun. 24, 2010

(30) Foreign Application Priority Data

Dec. 19, 2008 (JP) .................................. 2008-324417

(51) Int. Cl.
*G02F 1/1333* (2006.01)
(52) U.S. Cl. ........... 349/138; 349/155; 349/114; 349/38
(58) Field of Classification Search .................. 349/138, 349/114, 38, 155
See application file for complete search history.

(56) References Cited

U.S. PATENT DOCUMENTS

| | | | | |
|---|---|---|---|---|
| 4,775,225 | A * | 10/1988 | Tsuboyama et al. | 349/155 |
| 7,009,664 | B2 * | 3/2006 | Imayama et al. | 349/43 |
| 2001/0019372 | A1 * | 9/2001 | Ootsu et al. | 349/38 |
| 2003/0071956 | A1 * | 4/2003 | Sasaki et al. | 349/155 |
| 2006/0268216 | A1 * | 11/2006 | Song | 349/158 |
| 2007/0002261 | A1 * | 1/2007 | Lee et al. | 349/155 |
| 2007/0024799 | A1 * | 2/2007 | Kira et al. | 349/156 |
| 2007/0139604 | A1 * | 6/2007 | Paik et al. | 349/156 |
| 2008/0007687 | A1 * | 1/2008 | Konno | 349/156 |
| 2008/0013023 | A1 * | 1/2008 | Ochiai et al. | 349/114 |
| 2009/0059155 | A1 | 3/2009 | Nakayama | |

FOREIGN PATENT DOCUMENTS

| | | | |
|---|---|---|---|
| JP | 10-026762 | * | 1/1998 |
| JP | HEI 10-026762 A | | 1/1998 |
| JP | 2004-212746 | | 7/2004 |
| JP | 2007-334003 | | 12/2007 |
| JP | 2008-020753 | | 1/2008 |
| JP | 2008-058573 A | | 3/2008 |
| JP | 2009-058618 | | 3/2009 |
| JP | 2009-175568 A | | 6/2009 |
| JP | 2009-300648 A | | 12/2009 |
| JP | 2010-096891 A | | 4/2010 |

OTHER PUBLICATIONS

Japanese Patent Office, Office Action issued in Patent Application JP 2008-324417, on Dec. 1, 2010.

* cited by examiner

*Primary Examiner* — Edward Glick
*Assistant Examiner* — Sang Nguyen
(74) *Attorney, Agent, or Firm* — SNR Denton US LLP

(57) ABSTRACT

A liquid crystal display unit includes: a first substrate having an under-layered insulation film, a common electrode formed on the under-layered insulation film, and a pixel electrode formed over the common electrode with a pixel insulation film in between; a second substrate provided on pixel electrode side of the first substrate so as to oppose thereto; a liquid crystal layer provided between the first substrate and the second substrate; and a spacer provided to retain a distance between the first substrate and the second substrate, in such a manner that one end of the spacer is contacted with a top face of the pixel electrode. A thickness of the under-layered insulation film in a spacer region which is defined as a region occupied by the spacer is smaller than a thickness of the under-layered insulation film in a region other than the spacer region.

12 Claims, 14 Drawing Sheets

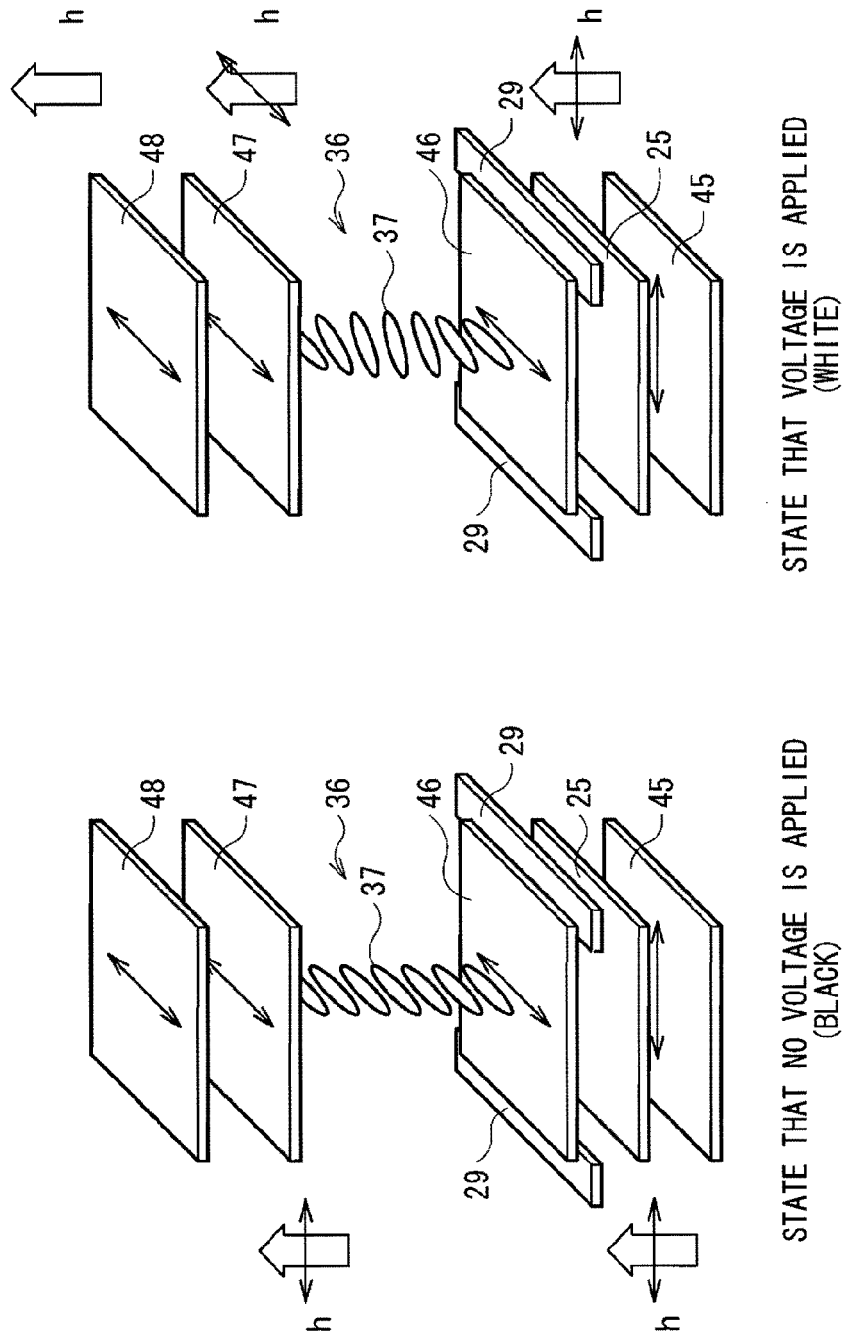
FIG. 3A STATE THAT NO VOLTAGE IS APPLIED (BLACK)
FIG. 3B STATE THAT VOLTAGE IS APPLIED (WHITE)

LIQUID CRYSTAL DISPLAY UNIT AND ELECTRONIC DEVICE

The present application claims the benefit of Japanese Patent Application JP 2008-324417 filed in the Japanese Patent Office on Dec. 19, 2008, the entire contents of which are hereby incorporated by reference.

BACKGROUND OF THE INVENTION

1. Field of the Invention

The present invention relates to a liquid crystal display unit performing display by transverse electric field mode liquid crystal and an electronic device including the same.

2. Description of the Related Art

As one type of liquid crystal display units, there is a liquid crystal display unit in which transverse electric field mode liquid crystal such as FFS (fringe field switching) mode is used. FIG. 15 illustrates a cross sectional section of enlarged part of an FFS mode liquid crystal display unit 100. The FFS mode liquid crystal display unit 100 includes two glass substrates 101a and 101b composing a liquid crystal display panel. A spacer 102 determining a distance between the glass substrates 101a and 101b is arranged between one glass substrate 101a and the other glass substrate 101b. On the one glass substrate 101a side, a thin film transistor 103 is formed. On the thin film transistor 103, an interlayer insulating film 104 for planarizing concavity and convexity is formed from an organic film or the like. On the interlayer insulating film 104, a common electrode film 105 and a pixel insulation film 106 are sequentially layered, and a pixel electrode film 107 provided with a slit gap is thereon layered. Between the pixel electrode film 107 and the other glass substrate 101b, a liquid crystal layer 108 is arranged. Examples of documents disclosing such a liquid crystal display unit 100 include Japanese Unexamined Patent Application Publication No. 2008-20753.

SUMMARY OF THE INVENTION

As described above, in the liquid crystal display unit, the spacer is arranged inside the pixel or outside the pixel. However, for example, in the case where the spacer is arranged inside the pixel, specific studies have not been made much on appropriate arrangement position of the spacer in the pixel, appropriate structures thereof and the like.

The foregoing FIG. 15 illustrates an example that the spacer 102 is arranged inside the pixel. If a pressing force is applied to the screen of the liquid crystal display unit 100 having such a structure, the force is transmitted to the spacer 102, and further transmitted to the pixel electrode film 107, the pixel insulation film 106, and the common electrode film 105 under the spacer. It is often the case that the pixel electrode film 107 and the common electrode film 105 are made of a hard material such as indium oxide, and the pixel insulation film 106 is made of a hard material such as SiN (silicon nitride). Meanwhile, the interlayer insulating film 104 under the common electrode film 105 is often formed from an organic material such as an acryl resin, and is soft and is easily deformed. Thus, in the case where a comparative large force is applied to the spacer 102, for example, as illustrated in FIG. 16, while the interlayer insulating film 104 in the arrangement region of the spacer 102 is deformed, a crack is generated in the pixel electrode film 107, the pixel insulation film 106, and the common electrode film 105, and in some cases, the pixel electrode film 107, the pixel insulation film 106, and the common electrode film 105 are totally broken. In this case, part of the broken pixel electrode film 107 or part of the common electrode film 105 causes short circuit between the pixel electrode film 107 and the common electrode film 105, and a pixel defect is generated in the liquid crystal display unit 100. In particular, such a problem becomes significant in the case where the thickness of the pixel insulation film 106 is decreased to heighten the pixel electric field.

Further, in recent years, a liquid crystal display unit having not only a display function but also a capture function (imaging function) has been proposed. In such a liquid crystal display unit having the capture function, in particular, the screen is frequently touched with a finger or the like, and thus there is a high possibility that the foregoing problem that the pixel defect resulting from applying pressure on the screen is generated.

In view of the foregoing disadvantage, in the invention, it is desirable to provide a liquid crystal display unit with which generation of the pixel defect resulting from applying pressure on the screen is prevented and reliability is able to be improved, and an electronic device including the same.

According to an embodiment of the invention, there is provided a liquid crystal display unit including: a first substrate having an under-layered insulation film, a common electrode formed on the under-layered insulation film, and a pixel electrode formed over the common electrode with a pixel insulation film in between; a second substrate provided on pixel electrode side of the first substrate so as to oppose thereto; a liquid crystal layer provided between the first substrate and the second substrate; and a spacer provided to retain a distance between the first substrate and the second substrate, in such a manner that one end of the spacer is contacted with a top face of the pixel electrode. A thickness of the under-layered insulation film in a spacer region which is defined as a region occupied by the spacer is smaller than a thickness of the under-layered insulation film in a region other than the spacer region. Examples of methods of forming the under-layered insulation film in the spacer region having a smaller thickness than the thickness of the under-layered insulation film in the region other than the spacer region include a method that part or all, in thickness, of the under-layered insulation film within the spacer region is replaced with a pedestal formed of a material which offers a higher resistance to compressive deformation compared to the under-layered insulation film, and a method of forming a concavity section in the under-layered insulation film in the spacer region. Further, in addition to the foregoing structure, the thickness of the pixel insulation film in the spacer region may be larger than the thickness of the pixel insulation film in the region other than the spacer region.

According to an embodiment of the invention, there is provided an electronic device including the liquid crystal display unit having the foregoing structure that the thickness of the under-layered insulation film in the spacer region which is defined as the region occupied by the spacer is smaller than the thickness of the under-layered insulation film in a region other than the spacer region.

In the liquid crystal display unit and the electronic device of the embodiments of the invention, in the case where an external pressing force is applied to the display face of the liquid crystal display unit, the pressing force is applied to the pixel electrode, the pixel insulation film, the common electrode, and the under-layered insulation film in the spacer region through the spacer. However, the thickness of the under-layered insulation film in the spacer region is smaller than that of the under-layered insulation film in the other regions. Thus, the compressive deformation amount thereof is smaller than a case that the thickness of the under-layered insulation film in the spacer region is similar to that of the under-layered insulation film in the other regions. Thus, the compressive deformation amount of the pixel electrode, the pixel insulation film, and the common electrode becomes small. Such an action is particularly significant in the case that the under-layered insulation film is made of a material having a comparatively small compressive deformation amount (soft material) such as an organic material.

According to the liquid crystal display unit and the electronic device of the embodiments of the invention, the thickness of the under-layered insulation film in the spacer region is smaller than that of the under-layered insulation film in the region other than the spacer region, and thereby the compressive deformation amount of the under-layered insulation film is decreased. Thus, a crack and a fracture in the pixel electrode, the pixel insulation film, the common electrode, and the under-layered insulation film are able to be inhibited from being generated. Therefore, generation of a pixel defect due to pressing the display face is decreased, and reliability is able to be improved.

Further, in addition to the foregoing structure, in the case where the thickness of the pixel insulation film in the spacer region is larger than the thickness of the pixel insulation film in the region other than the spacer region, the film strength of the pixel insulation film itself is improved. Thus, generation of a pixel defect due to a crack and a fracture is able to be more effectively inhibited.

Other and further objects, features and advantages of the invention will appear more fully from the following description.

BRIEF DESCRIPTION OF THE DRAWINGS

FIGS. 3A and 3B are views schematically illustrating a perspective structure of the liquid crystal display unit of the first embodiment;

DETAILED DESCRIPTION OF THE PREFERRED EMBODIMENTS

Embodiments of the invention will be hereinafter described in detail with reference to the drawings.

1. First Embodiment

Structure of Liquid Crystal Display Unit

Figure 1:
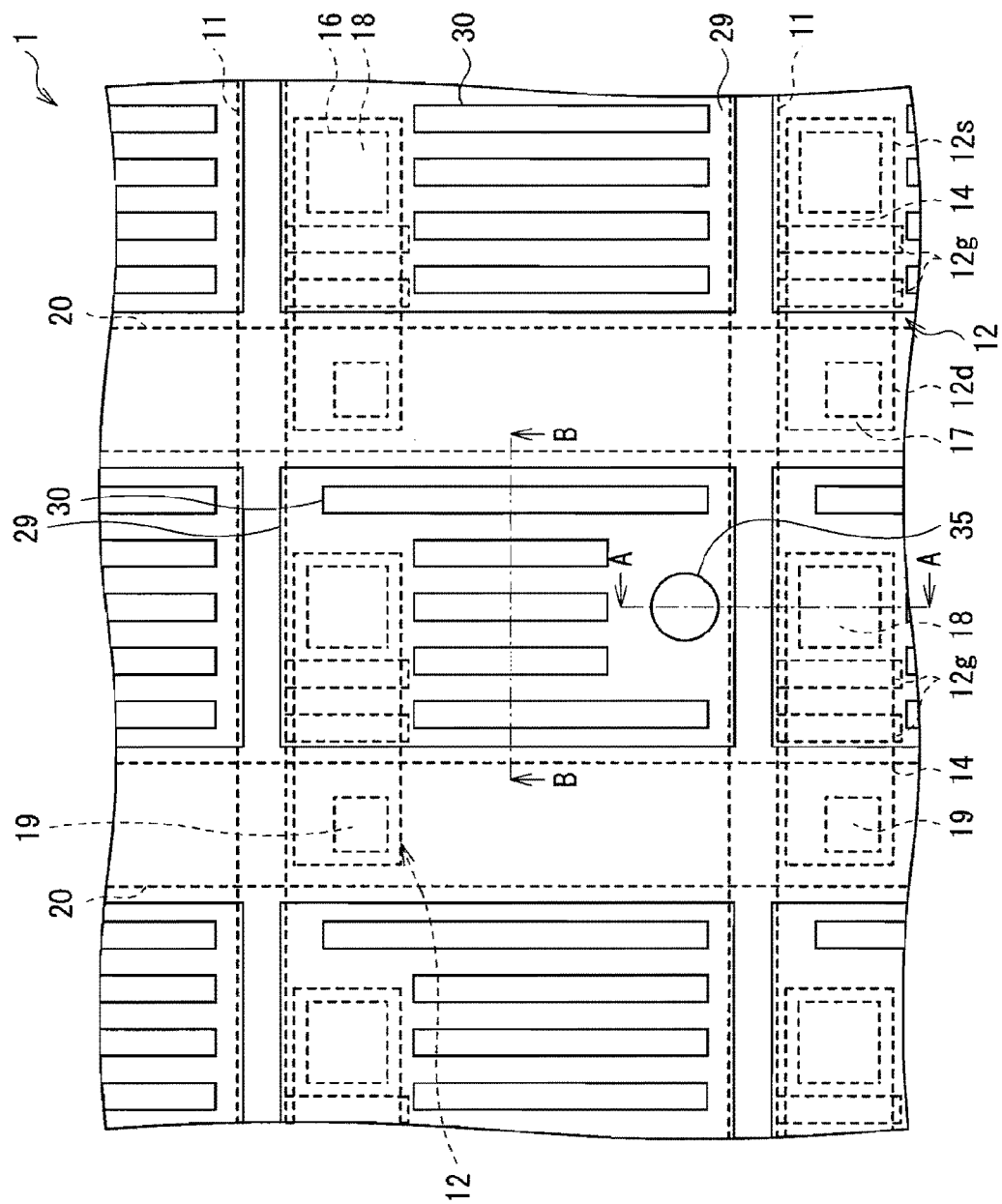
FIG. 1 is a plan view of a substantial part of a liquid crystal display unit according to a first embodiment.
Figure 2:
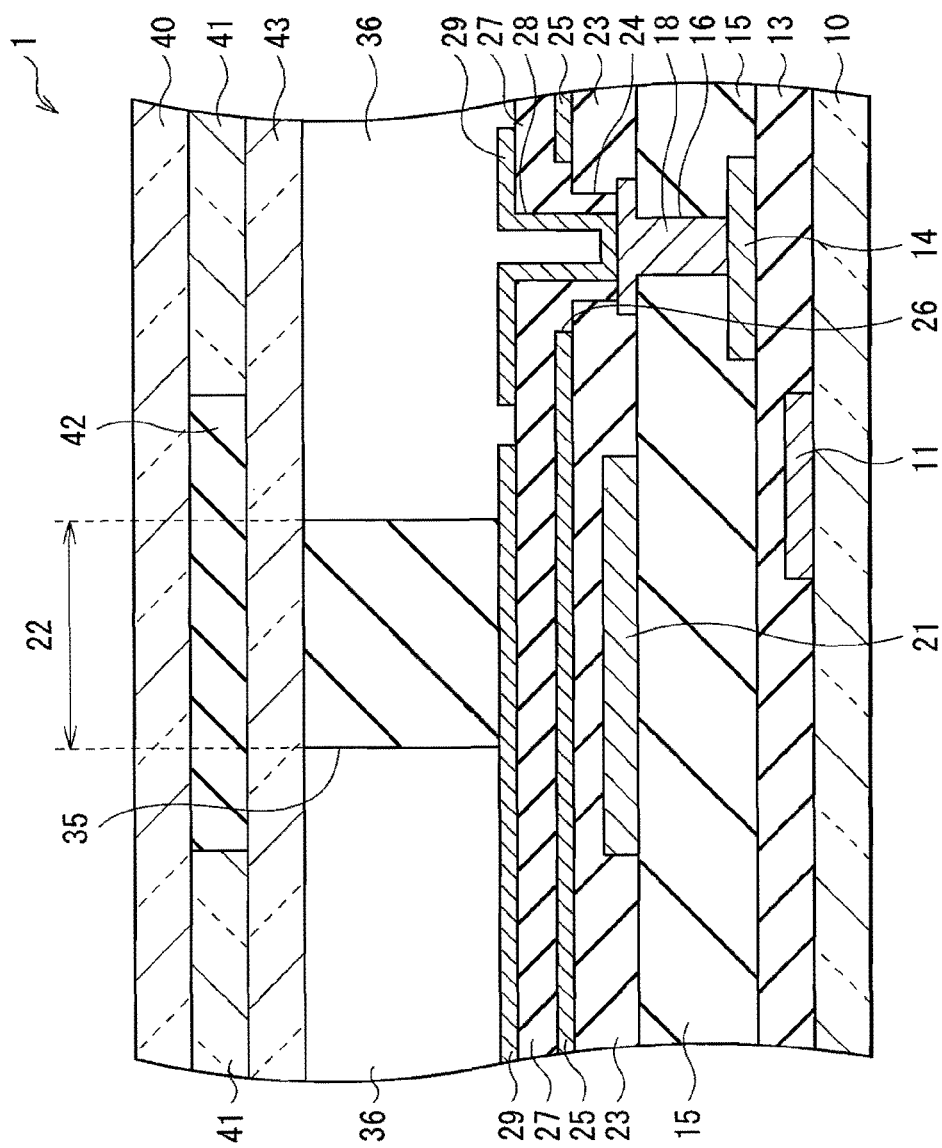
FIG. 2 is a cross sectional view taken along line A-A of FIG. 1.

FIG. 1 illustrates a planar structure of a substantial part of a liquid crystal display unit according to a first embodiment. FIG. 1 illustrates a state after omitting elements located above the liquid crystal layer. FIG. 2 illustrates a cross sectional structure taken along line A-A of FIG. 1.

As illustrated in FIG. 2, a liquid crystal display unit 1 includes a first glass substrate 10 and a second glass substrate 40. On the first glass substrate 10 side, a thin film transistor (TFT) 12 is provided for every pixel, and a pixel electrode 29 and a common electrode 25 are provided so that a pixel insulation film 27 is sandwiched between the pixel electrode 29 and the common electrode 25.

A detailed structure of the liquid crystal display unit 1 is as follows.

On the first glass substrate 10, a plurality of gate lines 11 as a selection line are extendedly provided in a row direction (horizontal direction in FIG. 1). In a region composing one pixel, a gate 12g of the TFT 12 for driving a pixel is extendedly provided in a column direction (vertical direction in FIG. 1) from the gate line 11. In FIG. 1, two gates 12g are extendedly provided in parallel with each other, resulting in so-called double gate structure.

As illustrated in FIG. 2, on the first glass substrate 10, a gate insulating film 13 is provided to cover the gate line 11 and the gate 12g of the TFT 12. On the gate insulating film 13, a semiconductor layer 14 as an active layer of the TFT 12 is provided. In the case of this embodiment, the semiconductor layer 14 is extendedly provided in the row direction (refer to FIG. 1). Out of the semiconductor layer 14, a region crossing the gate 12g structures a channel of the TFT 12. On the gate insulating film 13 and the semiconductor layer 14, an insulating transistor protective film 15 for protecting the TFT 12 is provided to cover the gate insulating film 13 and the semiconductor layer 14. Since the transistor protective film 15 is formed from, for example, SiN or the like, the transistor protective film 15 is a hard film and thus is hardly compressed and deformed.

In the transistor protective film 15, a first contact hole 16 is provided in the position as one end side of the semiconductor layer 14 (source 12s), and a second contact hole 17 is provided in the position as the other end side of the semiconductor layer 14 (drain 12d) (refer to FIG. 1). An electric conductor is filled into the first contact hole 16, and thereby a first contact 18 conducted to the semiconductor layer 14 is formed. Further, an electric conductor is filled into the second contact hole 17, and thereby a second contact 19 conducted to the semiconductor layer 14 is formed (refer to FIG. 1). The first contact 18 electrically connects the source 12s of the TFT 12 to the pixel electrode 29. The second contact 19 connects a data line 20 extendedly provided in the column direction on the transistor protective film 15 to the drain 12d of the TFT 12. A data signal (pixel voltage) is supplied from the data line 20 to the TFT 12 through the second contact 19. The data signal is supplied from the drain 12d of the TFT 12 to the pixel electrode 29 through the source 12s and the first contact 18 when the TFT 12 is in on-state.

On the transistor protective film 15, a pedestal 21 having a size slightly larger than that of a region occupied by a spacer 35 described later (spacer region 22) is arranged in the region occupied by the spacer 35. The pedestal 21 is made of a material that is hardly compressed and deformed more than an interlayer insulating film 23 described later such as an inorganic material. Specific examples of inorganic materials include the same metal material as the material of the first contact 18, a metal material other than the same metal material as the material of the first contact 18, SiN, and silicon oxide.

On the transistor protective film 15, the pedestal 21, the first contact 18, and the second contact 19, the interlayer insulating film 23 is provided to cover the transistor protective film 15, the pedestal 21, the first contact 18, and the second contact 19. The thickness of the interlayer insulating film 23 in the spacer region 22 is smaller than that of the interlayer insulating film 23 in the other regions. For example, by using an organic material such as an acryl resin as the interlayer insulating film 23, concavity and convexity generated in a lower layer become easily planarized, while the interlayer insulating film 23 is easily compressed and deformed. In the interlayer insulating film 23, an interlayer insulating film contact hole 24 reaching the top face of the first contact 18 is formed in the position where the interlayer insulating film contact hole 24 is overlapped with the first contact 18 in a top view. The interlayer insulating film 23 corresponds to a specific example of "under-layered insulation film" of the invention.

On the interlayer insulating film 23, a common electrode 25 is provided. In the common electrode 25, a common electrode contact hole 26 is formed in the position corresponding to the first contact 18. The hole size of the common electrode contact hole 26 is larger than that of the interlayer insulating film contact hole 24 to prevent short circuit between the common electrode 25 and the pixel electrode 29.

On the common electrode 25, a pixel insulation film 27 is provided. In the pixel insulation film 27, a pixel insulation film contact hole 28 reaching the top face of the first contact 18 is formed in the position corresponding to the first contact. The hole size of the pixel insulation film contact hole 28 is smaller than that of the common electrode contact hole 26.

On the pixel insulation film 27, the pixel electrode 29 is provided for every pixel. As illustrated in FIG. 1, the pixel electrode 29 is arranged so that both ends are overlapped with the respective gate lines 11, and thereby the pixel electrode 29 is bridged between adjacent two gate lines 11. As illustrated in FIG. 2, the pixel electrode 29 is formed to cover the internal face of the pixel insulation film contact hole 28 as well. The pixel electrode 29 is contacted with the first contact 18 at the bottom of the hole. Thereby, the source 12s of the TFT 12 is electrically connected to the pixel electrode 29 through the first contact 18. Further, in the pixel electrode 29, a plurality of long and thin apertures (slit 30) extending along the column direction are formed.

Meanwhile, under the second glass substrate 40, a layer composed of a color filter 41 and a black matrix 42 and a planarizing layer 43 are sequentially layered. Under the black matrix 42, a spacer 35 is provided. The size of the black matrix 42 is slightly larger than that of the spacer region 22, and thereby the black matrix 42 shields light entering the spacer region 22 and the surrounding area thereof. The black matrix 42 corresponds to a specific example of "light shielding layer" of the invention.

The bottom end of the spacer 35 is contacted with the top face of the pixel electrode 29 formed over the first glass substrate. Between the laminar structure on the second glass substrate 40 side and the laminar structure on the first glass substrate side, a liquid crystal layer 36 is provided. The spacer 35 penetrates through the liquid crystal layer 36, and functions to retain a given distance between the laminar structure on the first glass substrate side and the laminar structure on the second glass substrate 40 side. The spacer 35 and the black matrix 42 may be provided for all pixels, or may be provided for only partial pixels. In the case where the spacer 35 and the black matrix 42 are provided for partial pixels, the spacer 35 and the black matrix 42 may be provided for all/partial pixels of one color type out of blue pixels, green pixels, and red pixels. In this case, for example, the spacer 35 and the black matrix 42 are preferably provided for partial blue pixels or partial red pixels. In the blue pixels or the red pixels, due to their visibility characteristics, if the transmitted light amount is lowered associated with arrangement of the spacer 35, influence thereof is small. The first glass substrate including the transistor protective film 15, the pedestal 21, the interlayer insulating film 23, the common electrode 25, the pixel insulation film 27, the pixel electrode 29 and the like corresponds to a specific example of "first substrate" of the invention. The second glass substrate 40 including the color filter 41, the black matrix 42, and the planarizing layer 43 corresponds to a specific example of "second substrate" of the invention.

FIGS. 3A and 3B schematically illustrate a whole perspective structure of the liquid crystal display unit 1. As illustrated in FIG. 3, on the upper side (light output side) of the pixel electrode 29, a first oriented film 46, the liquid crystal layer 36, a second oriented film 47, and a second deflection plate 48 are arranged. Further, on the lower side (light entrance side) of the first glass substrate 10 (common electrode 25), a first deflection plate 45 is arranged. FIGS. 1 and 2 omit illustration of these elements.

Method of Manufacturing Liquid Crystal Display Unit

The liquid crystal display unit 1 having such a structure is able to be manufactured, for example, as follows. First, to form the gate line 11 and the gate 12g of the TFT 12 for driving the respective pixels of the liquid crystal display unit 1, a metal film is formed on the first glass substrate 10. The metal film may be formed by depositing a metal material such as molybdenum by using deposition method such as sputtering. After that, by using photolithography technology, a mask is formed and the metal film is etched, and thereby the gate line 11 and the gate 12g of the TFT 12 are formed.

Next, the gate insulating film 13 covering the first glass substrate 10, the gate line 11, and the gate 12g of the TFT 12 is formed. The gate insulating film 13 is formed by depositing an insulating material such as SiN by using deposition method such as plasma chemical vapor-phase deposition method (plasma CVD).

Next, the semiconductor layer 14 is formed. To form the semiconductor layer 14, first, a semiconductor material such as amorphous silicon to become the semiconductor layer 14 is deposited on the gate insulating film 13 by using deposition method such as plasma CVD. After that, by using photolithography technology, a mask is formed and the semiconductor material is etched, and thereby the semiconductor layer 14 is formed.

Next, the transistor protective film 15 for protecting the TFT 12 is formed on the semiconductor layer 14 and the gate insulating film 13. To form the transistor protective film 15, first, an insulating material such as SiN is deposited on the gate insulating film 13 by using deposition method such as plasma CVD to cover the semiconductor layer 14. After that, by using photolithography technology, a mask is formed on the gate insulating film 13 and the transistor protective film 15 is etched, so that the first contact hole 16 and the second contact hole 17 are respectively formed along the lamination direction.

Next, the pedestal 21, the data line 20, the first contact 18, and the second contact 19 are formed. To form the pedestal 21, the data line 20, the first contact 18, and the second contact 19, first, aluminum and titanium are deposited by deposition method such as sputtering, and thereby a metal laminated film is formed on the surface of the transistor protective film 15, the first contact hole 16, and the second contact hole 17. After that, the pedestal 21 and the data line 20 may be formed by forming a mask on the laminated metal film and etching the laminated metal film by using photolithography technology. The thickness of the pedestal 21 may be, for example, about 0.5 μm to 1 μm both inclusive. Further, in the case where the pedestal 21 is made of a material such as a metal through which light is not transmitted, the pedestal 21 is formed small so that the pedestal 21 is arranged inside the black matrix 42 in a top view. Thereby, light shielded by the pedestal 21 is able to be the minimum. Further, the first contact 18 and the second contact 19 may be formed by filling a laminated metal film in the first contact hole 16 and the second contact hole 17.

Next, on the transistor protective film 15, the pedestal 21, the data line 20, the first contact 18, and the second contact 19, the interlayer insulating film 23 is formed so that the film thickness thereof becomes, for example, about 1.5 μm to 2 μm both inclusive (film thickness of the other regions). The interlayer insulating film 23 may be formed from an insulating material, and is able to be formed from an acryl resin or the like. In this case, if the acryl resin is photo-sensitive, by using photolithography technology, the interlayer insulating film contact hole 24 is able to be easily formed. As described above, the interlayer insulating film 23 that insulates the data line 20, the first contact 18, and the second contact 19 from the common electrode 25 is formed.

Next, on the interlayer insulating film 23, the common electrode 25 as a transparent electrode is formed so that the film thickness thereof becomes, for example, about 0.05 μm to 0.1 μm both inclusive. To form the common electrode 25, first, by using deposition method such as sputtering, an electrode material such as indium oxide is deposited on the interlayer insulating film 23. After that, to form the common electrode contact hole 26, by using photolithography technology, a mask is formed and etching is provided. Thereby, the common electrode 25 including the common electrode contact hole 26 obtained by removing the region opposed to the first contact 18 is formed.

Next, on the common electrode 25, the pixel insulation film 27 having the film thickness of, for example, about 0.1 μm to 0.2 μm both inclusive is formed. The pixel insulation film 27 is formed by depositing an insulating material such as SiN on the common electrode 25 by using deposition method such as plasma CVD, and then forming a mask and providing etching by using photolithography technology. Thereby, the pixel insulation film 27 including the pixel insulation film contact hole 28 is obtained.

Next, on the pixel insulation film 27, the pixel electrode 29 is formed so that the film thickness thereof becomes, for example, about 0.05 μm to 0.1 μm both inclusive. The pixel electrode 29 is formed by depositing an electrode material such as indium oxide by using deposition method such as sputtering, and then forming a mask and providing etching by using photolithography technology. Thereby, the pixel electrode 29 including the slit 30 for applying an electric field to between the pixel electrode 29 and the common electrode 25 through the pixel insulation film 27 is obtained.

Meanwhile, for the second glass substrate 40, the color filter 41, the black matrix 42, the planarizing layer 43, and the spacer 35 are formed. First, the black matrix 42 is formed on the second glass substrate 40. The black matrix 42 is formed in a boundary line between different colors of the color filter 41 and in an upper end arrangement region of the spacer 35, that is, in a section where the black matrix 42 is overlapped with the spacer 35 in a top view. The black matrix 42 is obtained by coating the second glass substrate 40 with a black negative resist, and exposing and developing the result by using photolithography technology. Thereby, the resist in the exposed section is left on the second glass substrate 40 as the black matrix 42. A positive type black resist may be used.

Next, the color filter 41 is formed on the second glass substrate 40. The color filter 41 is formed for each color, that is, red, green, and blue. Specifically, the red color filter 41 is obtained in a region to become a red pixel by coating the second glass substrate 40 with a red negative color resist, and exposing and developing the result by using photolithography technology. After that, the green and blue color filters 41 are formed. The green and blue color filters 41 may be formed by a method similar to that of the red color filter 41. The order of forming the red color filter 41, the green color filter 41, and the blue color filter 41 may be a given order. A positive type color resist may be used.

Next, the planarizing layer 43 is formed on the black matrix 42 and the color filter 41. By the planarizing layer 43, concavity and convexity generated on the surface of the black matrix 42 and the color filter 41 are planarized.

Next, the spacer 35 is formed on the planarizing layer 43. The spacer 35 is obtained by coating the planarizing layer 43 with a negative resist, and exposing and developing the result by using photolithography technology. Thereby, the spacer 35 overlapped with the black matrix 42 in a top view is formed. A positive type resist may be used.

After that, the pixel electrode 29 formed on the first glass substrate 10 side and the spacer 35 formed on the second glass substrate 40 side are faced with each other, and the first glass substrate 10 side and the second glass substrate 40 side are bonded to each other. At this time, alignment is made so that the pedestal 21 is arranged on the lower side of the spacer 35, and one end of the spacer 35 is contacted with the pixel electrode 29. At this time, in the case where the pedestal 21 is formed from a material through which light is not transmitted, the pedestal 21 is arranged inside the black matrix 42 in a top view.

Next, liquid crystal is injected between the pixel electrode 29 and the planarizing layer 43 to form the liquid crystal layer 36. Thereby, the main manufacturing steps of the liquid crystal display unit 1 are completed.

Operation and Action of Liquid Crystal Display Unit 1

Figure 4A:
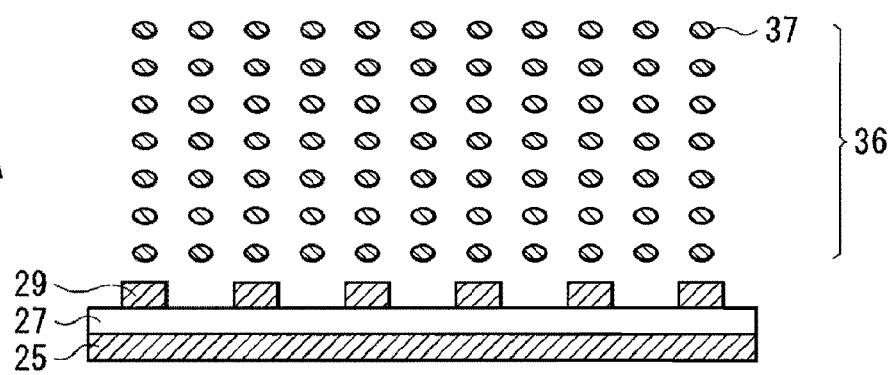
FIGS. 4A and 4B are cross sectional views taken along line B-B of FIG. 1.
Figure 4B:
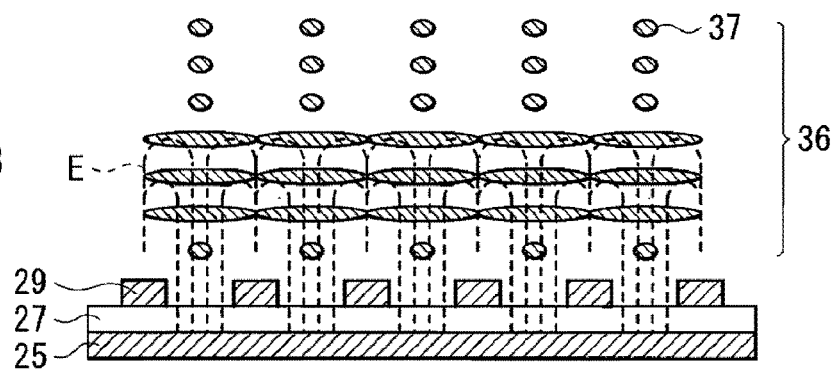

First, a description will be described on a basic operation of the liquid crystal display unit 1 by using FIGS. 3A to 4B. FIGS. 4A and 4B illustrate a cross section of the liquid crystal display unit 1 (cross section taken along B-B in FIG. 1). FIGS. 3A and 4A illustrate a state that no voltage is applied. FIGS. 3B and 4B illustrate a state that a voltage is applied.

Light from a backlight (not illustrated) arranged on the rear side (lower side in FIG. 2) of the first glass substrate 10 enters the liquid crystal display unit 1. The light entering the liquid crystal layer 36 receives FFS mode spatial modulation described below when the light passes the liquid crystal layer 36.

That is, as illustrated in FIGS. 3A and 4A, in a state that no voltage is applied to between the common electrode 25 and the pixel electrode 29, an axis of a liquid crystal molecule 37 composing the liquid crystal layer 36 is perpendicular to a transmission axis of the first deflection plate 45 on the entrance side, and is parallel to a transmission axis of the second deflection plate 48 on the output side. Thus, entering light h that has been transmitted through the first deflection plate 45 on the entrance side reaches the second deflection plate 48 on the output side without generating phase difference in the liquid crystal layer 36 and is absorbed therein, resulting in black display.

Meanwhile, as illustrated in FIGS. 3B and 4B, in a state that a voltage is applied to between the common electrode 25 and the pixel electrode 29, due to an electric field E generated between each pixel electrode 29, the orientation direction of the liquid crystal molecule 37 is rotated in a diagonal direction with respect to the extension direction of the pixel electrode 29. At this time, the electric field intensity at the time of white display is optimized so that the liquid crystal molecule 37 positioned in the center of the liquid crystal layer 36 in the thickness direction is rotated about 45 degree. Thereby, entering light that has been transmitted through the first deflection plate 45 on the entrance side generates phase difference while being transmitted through the liquid crystal layer 36, becomes straight polarized light rotated 90 degree, is transmitted through the second deflection plate 48 on the output side, resulting in white display.

Figure 5:
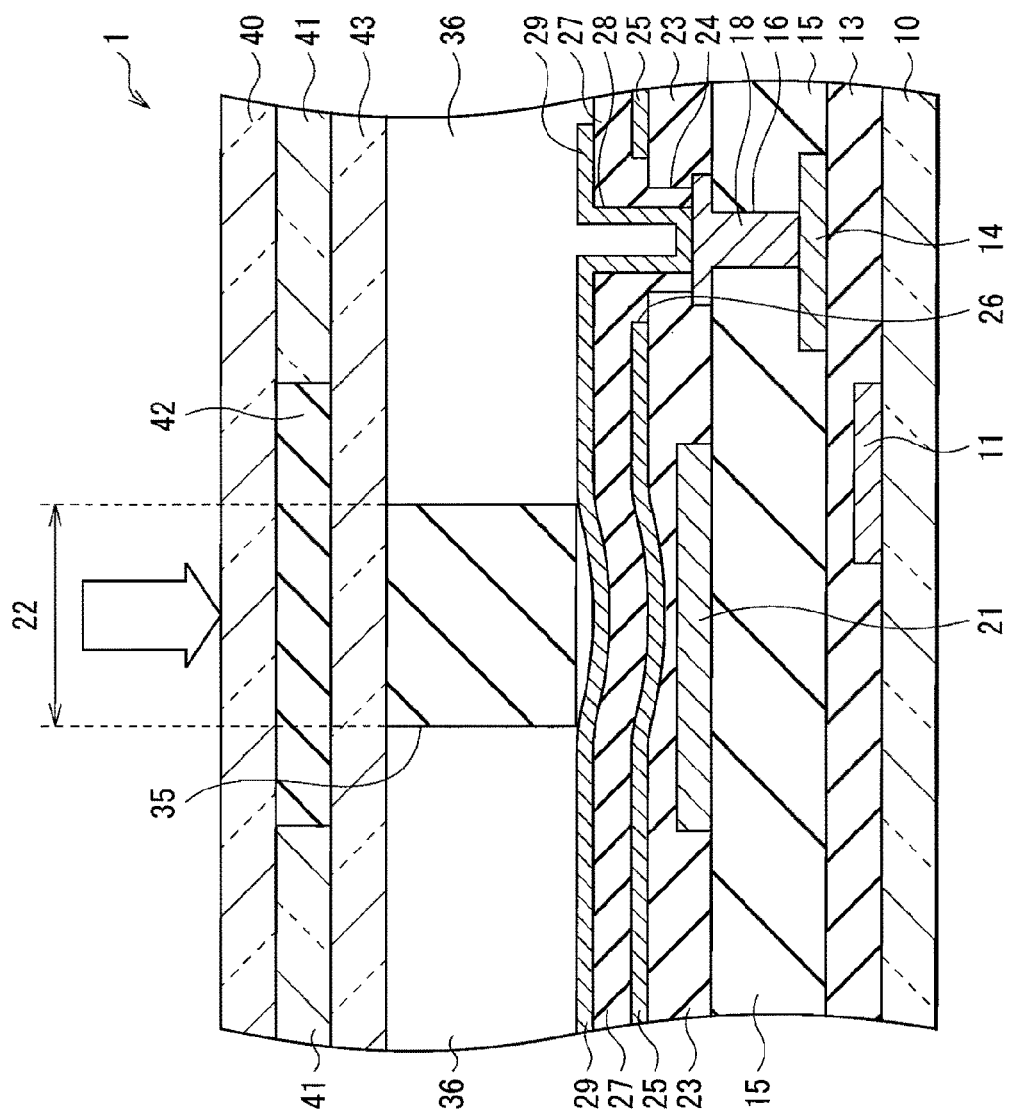
FIG. 5 is a cross sectional view explaining action of the liquid crystal display unit of the first embodiment.

Next, a description will be given on characteristic action of the liquid crystal display unit 1. FIG. 5 illustrates a cross sectional structure of the liquid crystal display unit 1. In FIG. 5, only elements necessary for the description are affixed with referential symbols, and referential symbols of the other elements are omitted. As indicated by an arrow in FIG. 5, in the case where a force is applied from the second glass substrate 40 side to the liquid crystal display unit 1, a downward force is applied to the spacer 35, and a compression pressure is applied to the interlayer insulating film 23 in the spacer region 22 as well. However, since the pedestal 21 is provided at the lowermost part of the interlayer insulating film 23 in the thickness direction in the spacer region 22, the interlayer insulating film 23 in the spacer region 22 is thinner than the interlayer insulating film 23 in the other regions. Thus, the compressive deformation amount thereof is smaller than a case that the thickness of the interlayer insulating film 23 in the spacer region 22 is equal to that of the interlayer insulating film 23 in the other regions. Therefore, the compressive deformation amount of the common electrode 25, the pixel insulation film 27, and the pixel electrode 29 in the spacer region 22 becomes small. In result, the common electrode 25, the pixel insulation film 27, and the pixel electrode 29 are hardly broken.

As described above, according to this embodiment, since in the spacer region 22, part of the interlayer insulating film 23 in the thickness direction is substituted with the pedestal 21, the thickness of the interlayer insulating film 23 is decreased. Thus, the deformation amount of the interlayer insulating film 23, the common electrode 25, and the pixel electrode 29 in the spacer region 22 is able to be decreased as well. Thus, even if a pressure is applied to the spacer 35, a crack and a fracture are hardly generated in the common electrode 25, the pixel insulation film 27, and the pixel electrode 29, and a pixel defect is able to be inhibited from being generated. That is, since the strength of the liquid crystal display unit 1 is able to be increased, reliability is able to be increased. In result, the liquid crystal display unit 1 is able to be thinned as a whole.

Modified Examples

While the first embodiment has been hereinbefore described, various modifications may be made for the liquid crystal display unit 1 of this embodiment.

Figure 6A:
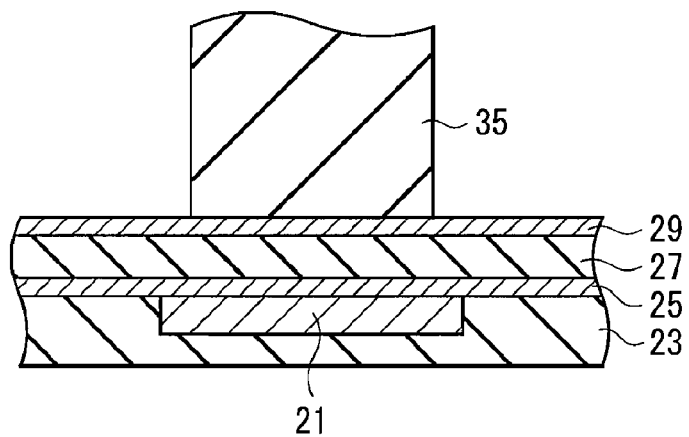
FIGS. 6A and 6B are cross sectional views in a spacer region of a liquid crystal display unit according to a first modified example of the first embodiment.
Figure 6B:
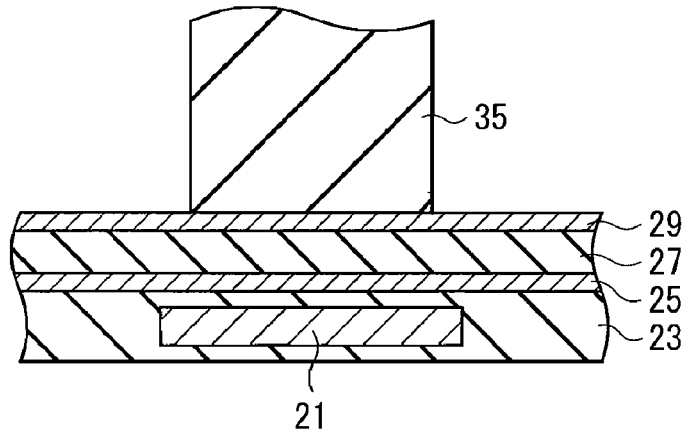
Figure 7:
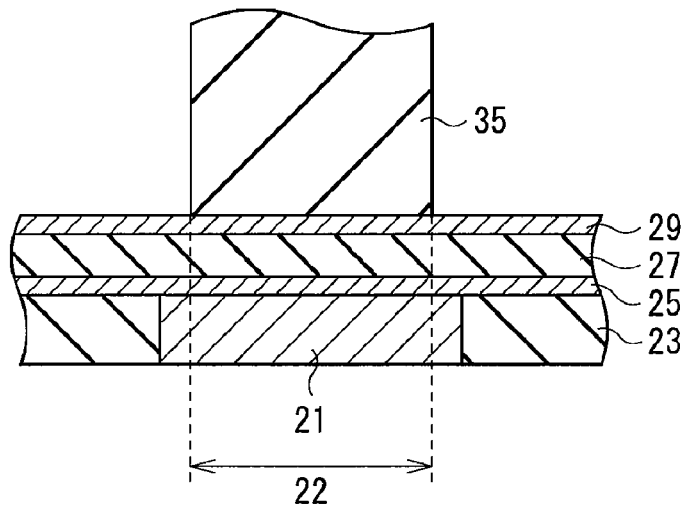
FIG. 7 is a cross sectional view in a spacer region of a liquid crystal display unit according to a second modified example of the first embodiment.

For example, in the foregoing embodiment, the description has been given of the case that in the spacer region 22, the pedestal 21 is arranged in the lowermost layer of the interlayer insulating film 23. However, the pedestal 21 may be arranged at least in part of the interlayer insulating film 23 in the thickness direction. That is, as illustrated in FIG. 6A, the pedestal 21 may be arranged in the uppermost section of the interlayer insulating film 23, or as illustrated in FIG. 6B, the pedestal 21 may be arranged in the intermediate section of the interlayer insulating film 23 in the thickness direction. Further, as illustrated in FIG. 7, the whole interlayer insulating film 23 in the thickness direction in the spacer region 22 may be substituted with the pedestal 21.

Figure 8:
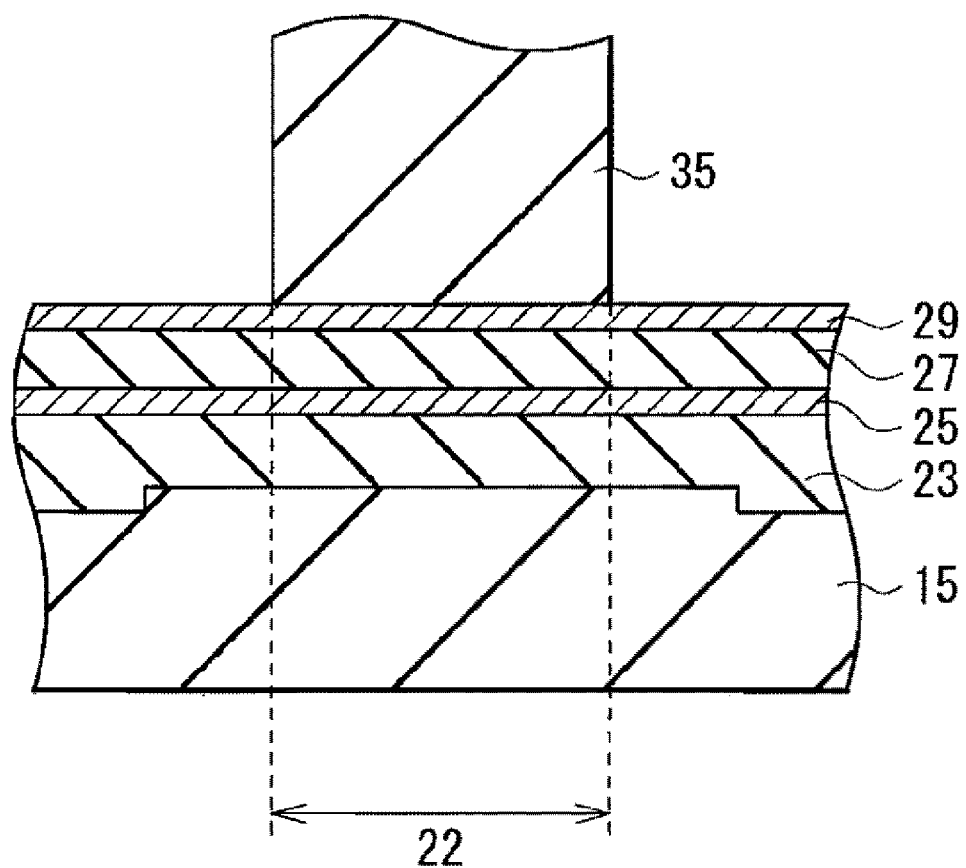
FIG. 8 is a cross sectional view in a spacer region of a liquid crystal display unit according to a third modified example of the first embodiment.

Further, in the foregoing embodiment, the description has been given of the case that the thickness of the interlayer insulating film 23 is decreased by separately providing the pedestal 21 in the spacer region 22. However, as illustrated in FIG. 8, it is possible that the transistor protective film 15 in the spacer region 22 is formed into the upward convex shape, and thereby the thickness in the spacer region 22 of the interlayer insulating film 23 arranged thereon is decreased compared to that in the other regions.

A description will be hereinafter given of other embodiments of the invention. In the following description of the embodiments, for the same elements as those of the first embodiment, the same referential symbols are affixed thereto, and detailed descriptions thereof will be omitted or simplified.

Second Embodiment

Structure and Action of Liquid Crystal Display Unit

Figure 9:
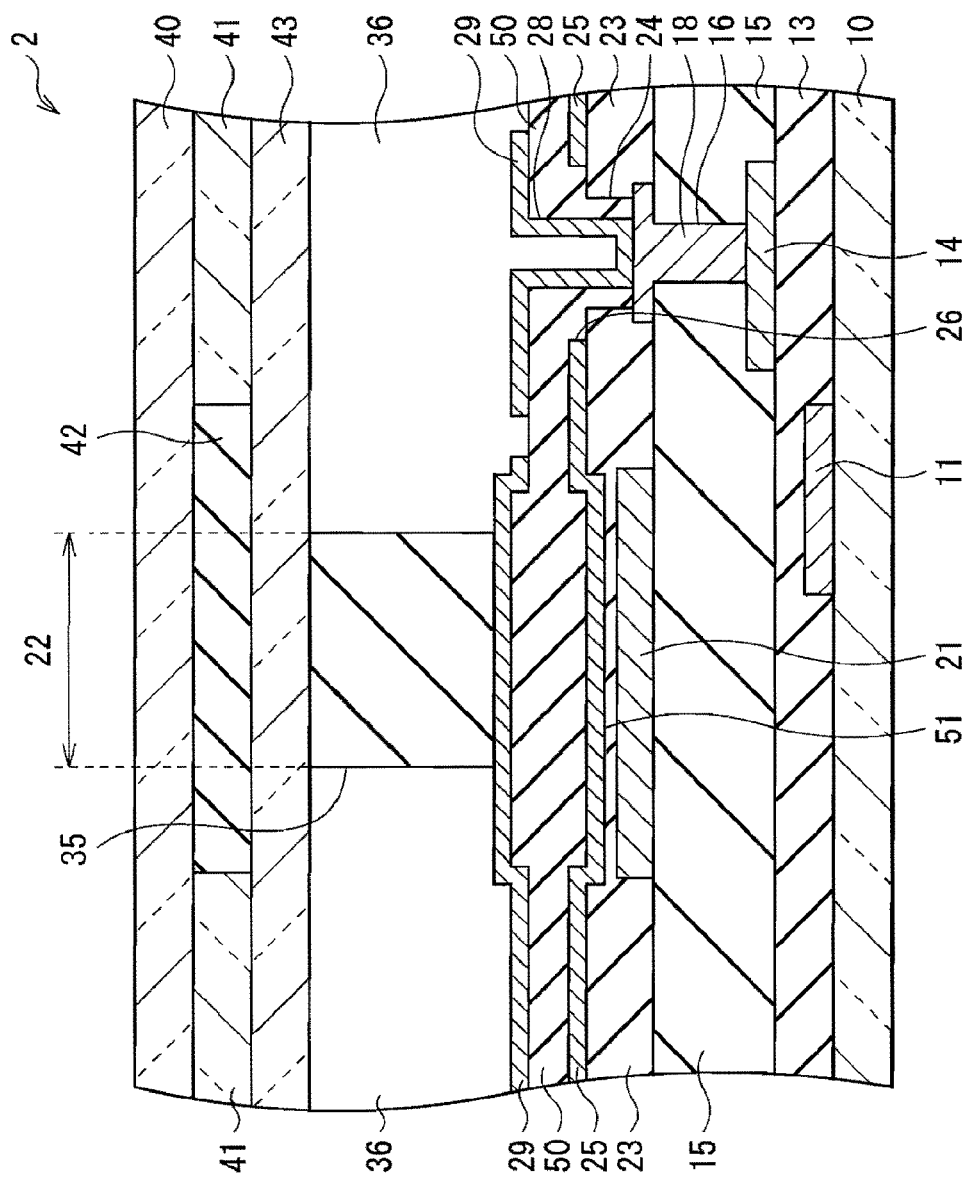
FIG. 9 is a cross sectional view of a liquid crystal display unit according to a second embodiment.

FIG. 9 illustrates a cross sectional structure of a liquid crystal display unit according to a second embodiment. A liquid crystal display unit 2 is different from the liquid crystal display unit 1 of the first embodiment mainly in the structure of a pixel insulation film 50. The thickness in the spacer region 22 in the pixel insulation film 50 is formed larger than the thickness in the other regions. That is, the pixel insulation film 50 is in the upward and downward convex shape. The thickness of the interlayer insulating film 23 in the spacer region 22 is smaller than that of the interlayer insulating film 23 in the other regions, and strength to pressure is increased therein. Thus, the deformation amount of the common electrode 25, the pixel insulation film 50, and the pixel electrode 29 in the spacer region 22 becomes small. In particular, since the pixel insulation film 50 in the spacer region 22 is in the downward convex shape, the distance between the common electrode 25 and the pedestal 21 is able to be decreased compared to that of the liquid crystal display unit 1 of the first embodiment. Thus, the compressive deformation amount of the interlayer insulating film 23 is able to be further decreased. Further, even if a pressure is applied to the spacer 35, a crack and a fracture are able to be hardly generated in the pixel insulation film 50.

Figure 10A:
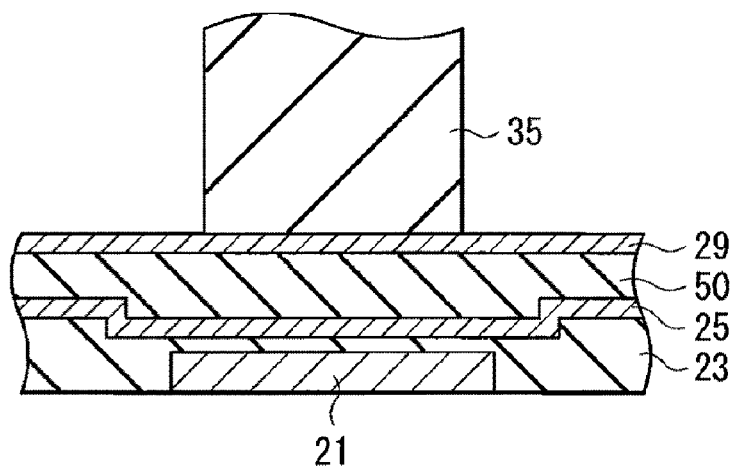
FIGS. 10A and 10B are cross sectional views in a spacer region of a liquid crystal display unit according to a modified example of the second embodiment.
Figure 10B:
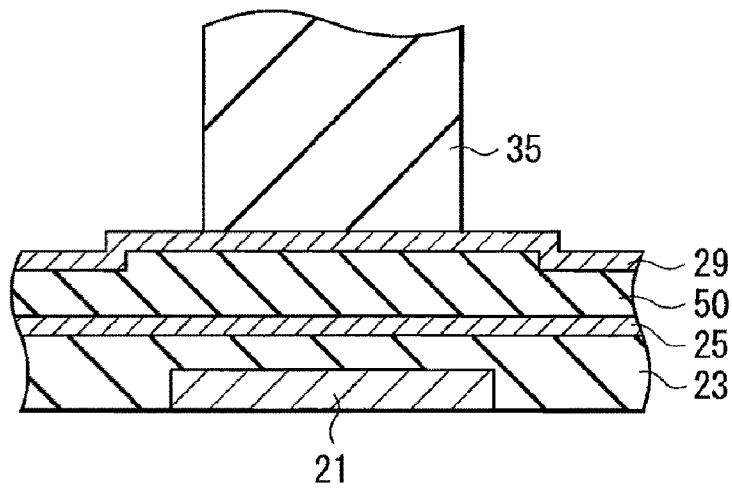

Further, in the foregoing embodiment, the description has been given of the case that the pixel insulation film 50 is in the upward and downward convex shape. However, as illustrated in FIG. 10A, the pixel insulation film 50 may be in the only downward convex shape. In this case, it is enough that the pixel insulation film 50 is formed so that the top face becomes flat by SOG (spin on glass) method. Further, as illustrated in FIG. 10B, the pixel insulation film 50 may be in the only upward convex shape.

Method of Manufacturing Liquid Crystal Display Unit

The liquid crystal display unit 2 having such a structure is able to be manufactured, for example, as follows. FIGS. 11A to 11D illustrate part of manufacturing steps of the liquid crystal display unit 2.

Figure 11A:
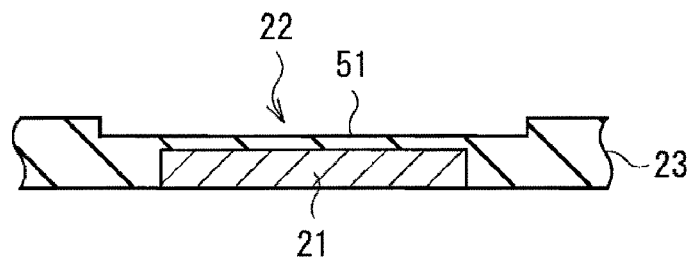
FIGS. 11A to 11D are views illustrating part of manufacturing steps of the liquid crystal display unit according to the second embodiment.
Figure 11B:
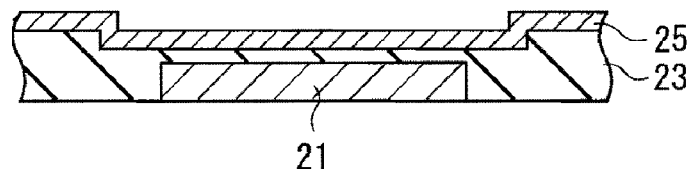

After the pedestal 21 is formed on the transistor protective film 15, the interlayer insulating film 23 is formed on the transistor protective film 15 and the pedestal 21. After that, the spacer region 22 in the top face of the interlayer insulating film 23 is etched to form a concavity section 51 (FIG. 11A). Next, on the interlayer insulating film 23, the common electrode 25 along the lines of the top face shape thereof is formed (FIG. 11B).

Figure 11C:
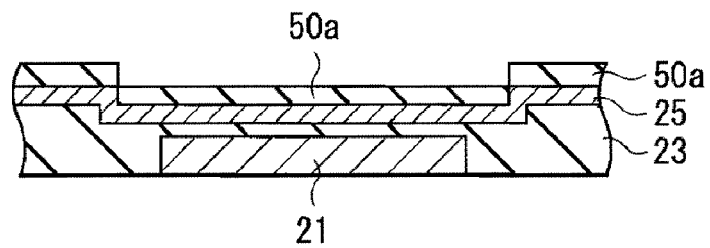
Figure 11D:
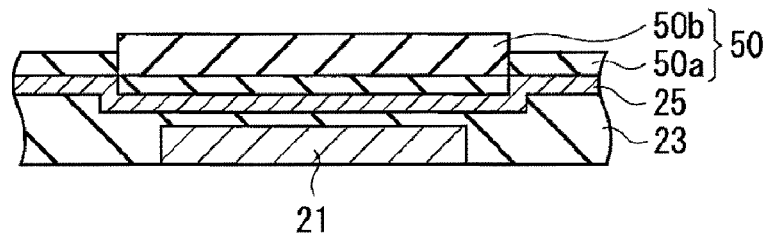

Next, the pixel insulation film 50 is formed on the common electrode 25. In forming the pixel insulation film 50, first, after a first dielectric body such as SiN is formed on the common electrode 25 by CVD method or SOG method, patterning and etching are provided to form a first dielectric body film 50a (FIG. 11C). After that, a second dielectric body having an etching rate different from that of the first dielectric body such as silicon oxide is formed by CVD method. At this time, a second dielectric body film 50b is formed thicker than the first dielectric body film 50a. After that, patterning and etching are provided, and thereby the pixel insulation film 50 in the upward and downward convex shape is obtained (FIG. 11D).

In this embodiment, the description has been given of the case that after the first dielectric body film 50a is formed by CVD method or SOG method, the second dielectric body film 50b is formed by CVD method, and thereby the pixel insulation film 50 is obtained. However, the pixel insulation film 50 may be formed by the following method. First, a dielectric body is formed on the common electrode 25, and patterning and etching are made to form the shape as illustrated in FIG. 11C. After that, a dielectric body is formed by SOG method, and patterning is made. Accordingly, the pixel insulation film 50 as illustrated in FIG. 11D may be formed.

While the invention has been described with reference to the embodiments, the invention is not limited to the foregoing embodiments, and various modifications may be made.

Figure 12:
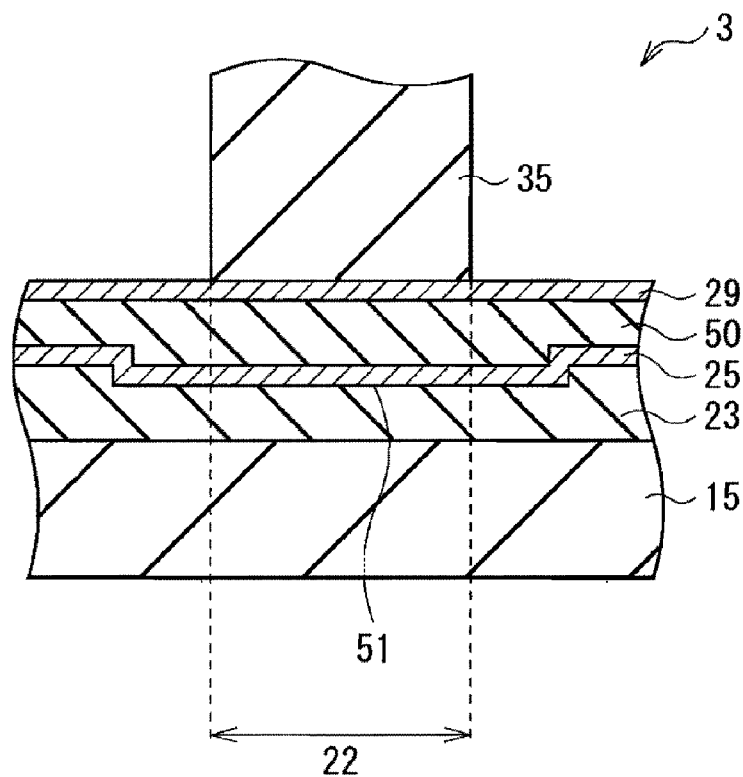
FIG. 12 is a cross sectional view in a spacer region of a liquid crystal display unit according to a third embodiment.

FIG. 12 illustrates a cross sectional structure in a spacer region of a liquid crystal display unit according to a third embodiment. In this liquid crystal display unit 3, though the pedestal 21 is not provided, the pixel insulation film 50 in the spacer region 22 is in the downward convex shape. Thus, the thickness of the interlayer insulating film 23 in the spacer region 22 is smaller than that of the interlayer insulating film 23 in the other regions. Thus, in the case where a downward force is applied to the spacer 35, the compressive deformation amount of the interlayer insulating film 23 is decreased. Further, since the pixel insulation film 50 in the spacer region 22 is in the downward convex shape, the thickness of the pixel insulation film 50 in the spacer region 22 is increased and the strength to pressure is increased. Therefore, the deformation amount of the common electrode 25, the pixel insulation film 50, and the pixel electrode 29 in the spacer region 22 is decreased.

Figure 13:
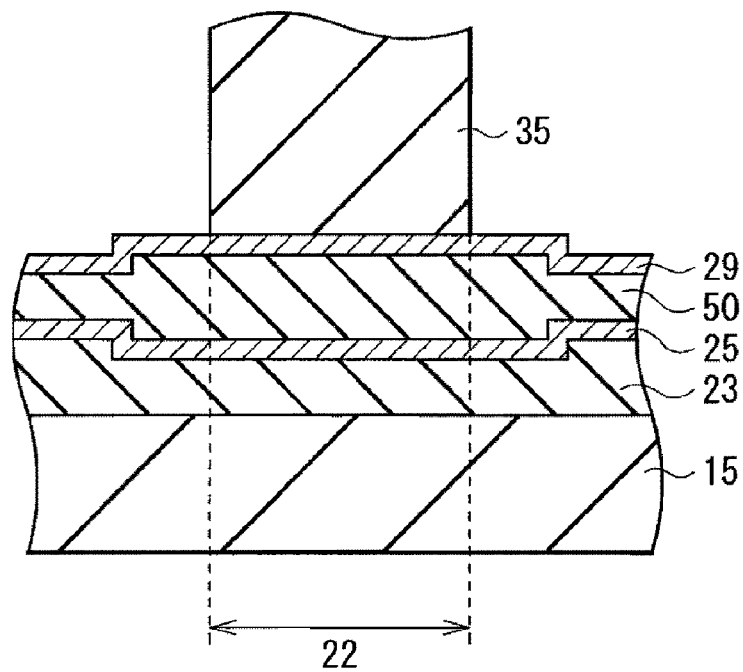
FIG. 13 is a cross sectional view in a spacer region of a liquid crystal display unit according to a modified example of the third embodiment.

Further, as illustrated in FIG. 13, the pixel insulation film 50 in the spacer region 22 may be in the upward and downward convex shape.

Further, as long as the liquid crystal display units 1 to 3 of the invention are able to be realized, the shape and the material are able to be changed within the scope of the purpose of the invention. For example, the description has been given of the case that the organic material is used for the interlayer insulating film 23. However, as long as a film is easily planarized, the material is not limited to the organic material, but an inorganic material may be used as well.

Application Example of Liquid Crystal Display Unit

The liquid crystal display units 1 to 3 described in the foregoing embodiments are able to be applied to a display unit of electronic devices in any field for displaying a video signal inputted to the electronic device or a video signal generated in the electronic device as an image or a video such as a mobile terminal device such as a mobile phone.

Figure 14:
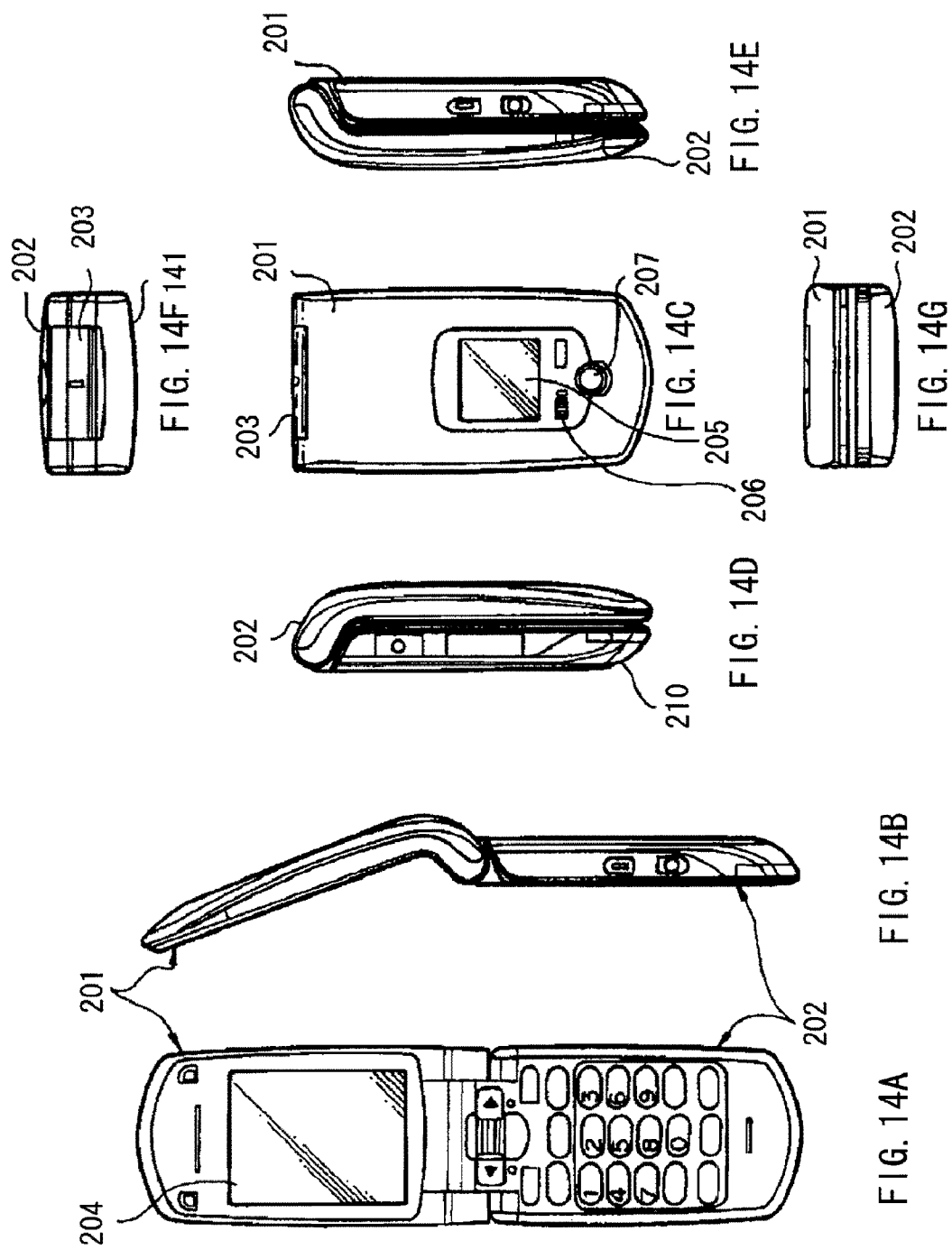
FIGS. 14A to 14G are appearance views of a mobile phone as a specific example to which the liquid crystal display units are applied.
Figure 15:
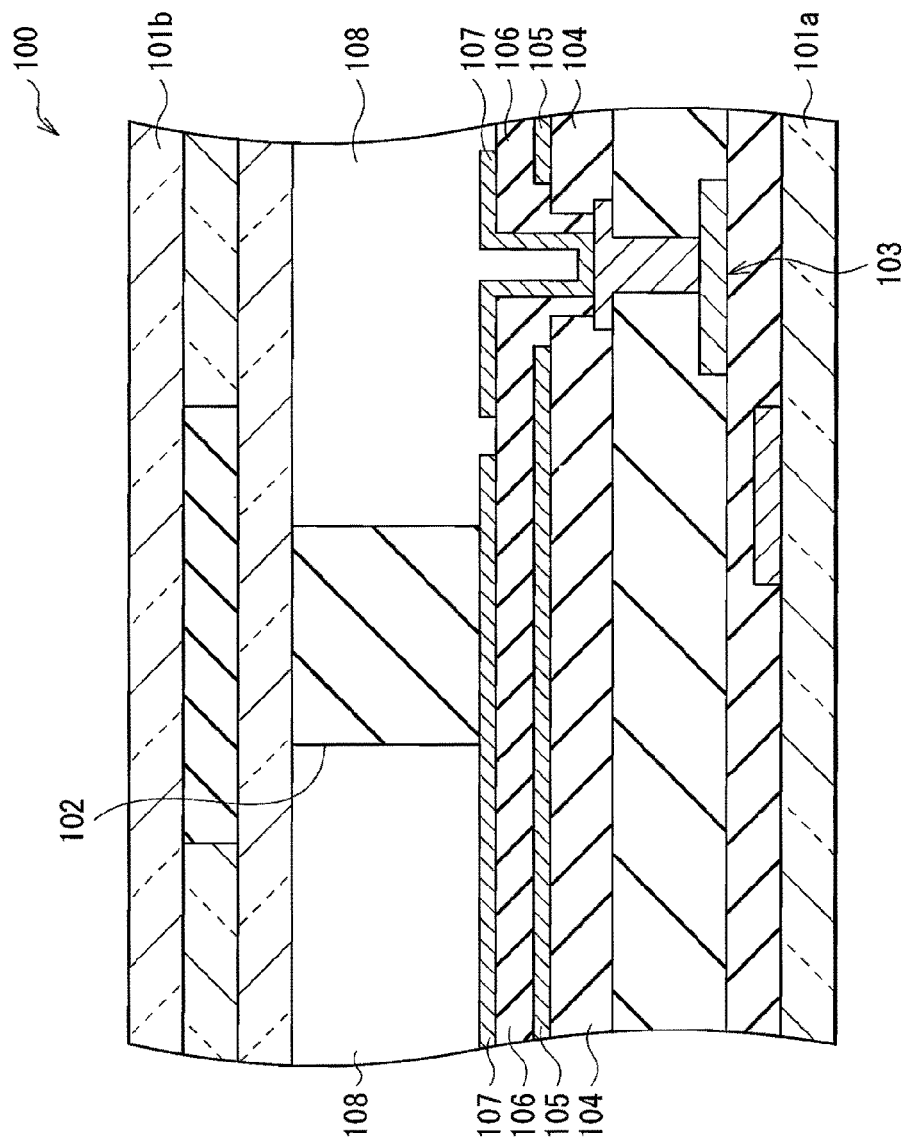
FIG. 15 is a cross sectional view illustrating a main structure of an existing FFS mode liquid crystal display unit.
Figure 16:
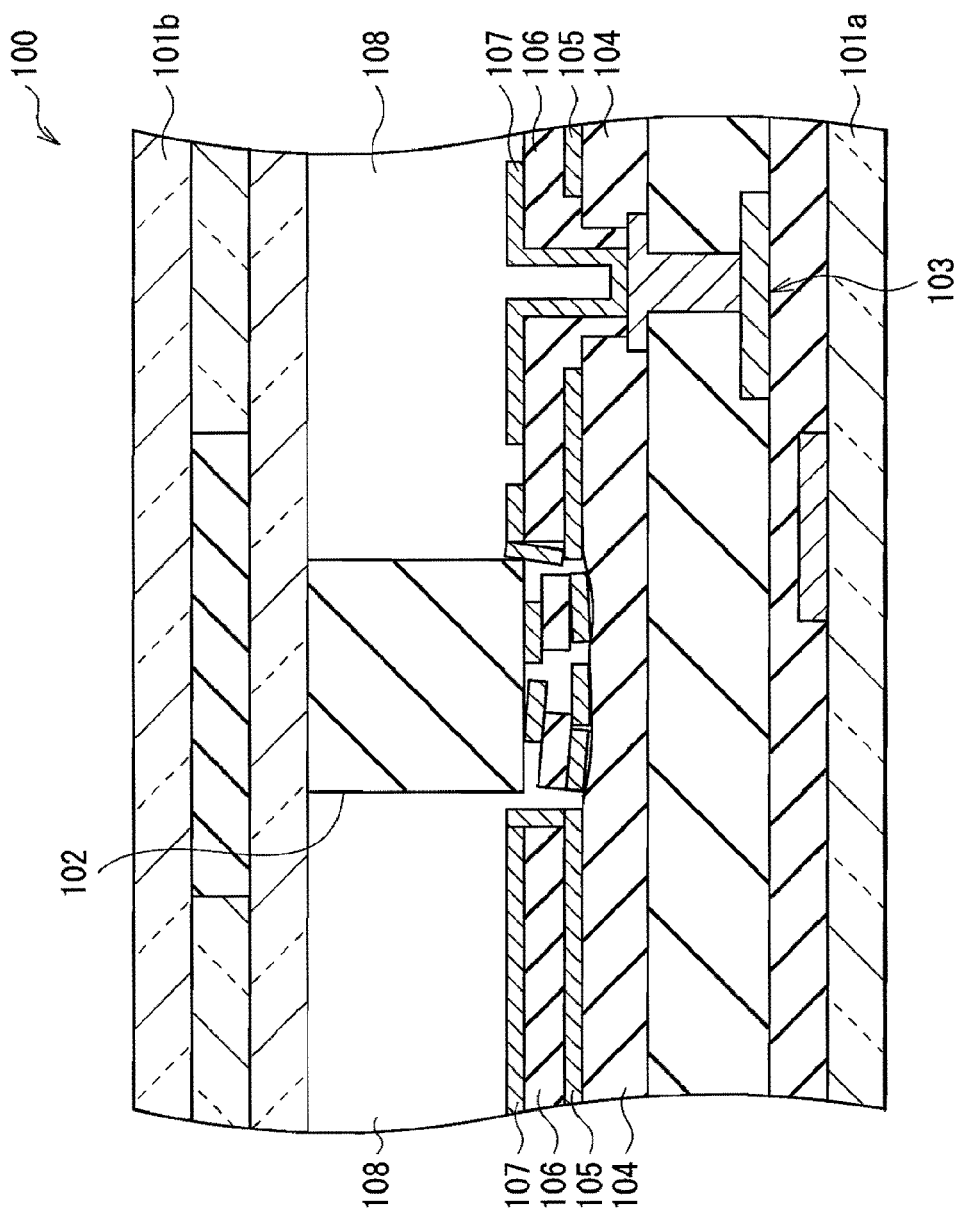
FIG. 16 is a cross sectional view illustrating a state when a pixel electrode film, a pixel insulation film, and a common electrode film are broken in the liquid crystal display unit illustrated in FIG. 15.

FIGS. 14A to 14G illustrate an appearance of a mobile phone as a specific example to which the liquid crystal display units 1 to 3 of the foregoing embodiments are applied. FIG. 14A is an elevation view of this application example unclosed, FIG. 14B is a side view thereof, FIG. 14C is an elevation view of this application example closed, FIG. 14D is a left side view thereof, FIG. 14E is a right side view thereof, FIG. 14F is a top view thereof, and FIG. 14G is a bottom view thereof. The mobile phone includes an upper package 201, a lower package 202, a joint section (in this case, a hinge section) 203, a display 204, a sub-display 205, a picture light 206, a camera 207 and the like. The display 204 or the sub-display 205 is composed of the liquid crystal display units 1 to 3 of the embodiments. Thereby, in the mobile phone, the reliability and the durability are improved.

It should be understood by those skilled in the art that various modifications, combinations, sub combinations and alternations may occur depending on design requirements and other factors insofar as they are within the scope of the appended claims or the equivalents thereof.

What is claimed is:

1. A liquid crystal display unit comprising:
   a first substrate having (i) an under-layered insulation film, (ii) a common electrode formed on the under-layered insulation film, and (iii) a pixel electrode formed over the common electrode with a pixel insulation film between the pixel electrode and the common electrode;
   a second substrate provided on a pixel electrode side of the first substrate such that the second substrate is opposite the first substrate;
   a liquid crystal layer provided between the first substrate and the second substrate; and
   a spacer provided between the first substrate and the second substrate to retain a distance between the first substrate and the second substrate, the spacer arranged such that one end of the spacer that faces the first substrate is in direct contact with a top face of the pixel electrode in the first substrate,
   wherein,
      the common electrode is under the pixel electrode with the pixel insulation film between the pixel electrode and the common electrode, and a thickness of the under-layered insulation film under the common electrode in a spacer region defined as a region occupied by the spacer is smaller than a thickness of the under-layered insulation film in a region other than the spacer region.

2. The liquid crystal display unit according to claim 1, wherein a part or all of the under-layered insulation film, in a thickness direction, under the common electrode within the spacer region is replaced with a pedestal formed from a different material than the under-layered insulation film so that the thickness of the under-layered insulation film under the common electrode in the spacer region is smaller than the thickness of the under-layered insulation film in the region other than the spacer region.

3. The liquid crystal display unit according to claim 2, wherein the pedestal is provided in a lowermost portion, in the thickness direction, of the under-layered insulation film.

4. The liquid crystal display unit according to claim 2, wherein the under-layered insulation film is formed of an organic material, while the pedestal is formed of an inorganic material.

5. The liquid crystal display unit according to claim 4, wherein the inorganic material is one of a metal, silicon oxide, and silicon nitride.

6. The liquid crystal display unit according to claim 2, further comprising:
    a light shielding layer selectively provided on the second substrate, in a region including the spacer region, and
    the pedestal is located in a region occupied by the light shielding layer.

7. The liquid crystal display unit according to claim 1, wherein a thickness of the pixel insulation film in the spacer region is larger than a thickness of the pixel insulation film in the region other than the spacer region.

8. The liquid crystal display unit according to claim 7, wherein the pixel insulation film has a shape such that in the spacer region, the pixel insulation film protrudes toward at least one of the common electrode side and the pixel electrode side.

9. The liquid crystal display unit according to claim 1, wherein, in the spacer region, a top face of the under-layered insulation film, facing the common electrode, has a recessed section so that the thickness of the under-layered insulation film under the common electrode in the spacer region is smaller than the thickness of the under-layered insulation film in the region other than the spacer region.

10. The liquid crystal display unit according to claim 9, wherein a top face of the pixel insulation film, facing the pixel electrode, is planarized so that the thickness of the pixel insulation film in the spacer region is larger than the thickness of the pixel insulation film in the region other than the spacer region.

11. An electronic device comprising a liquid crystal display unit, the liquid crystal display unit including:
    a first substrate having (i) an under-layered insulation film, (ii) a common electrode formed on the under-layered insulation film, and (iii) a pixel electrode formed over the common electrode with a pixel insulation film between the pixel electrode and the common electrode;
    a second substrate provided on a pixel electrode side of the first substrate such that the second substrate is opposite the first substrate;
    a liquid crystal layer provided between the first substrate and the second substrate; and
    a spacer provided between the first substrate and the second substrate to retain a distance between the first substrate and the second substrate, the spacer arranged such that one end of the spacer that faces the first substrate is in direct contact with a top face of the pixel electrode in the first substrate,
    wherein,
        the common electrode is under the pixel electrode with the pixel insulation film between the pixel electrode and the common electrode, and
        a thickness of the under-layered insulation film under the common electrode in a spacer region defined as a region occupied by the spacer is smaller than a thickness of the under-layered insulation film in a region other than the spacer region.

12. The liquid crystal display unit according to claim 2, wherein the material of the pedestal has a higher resistance to compressive deformation than the under-layered insulation film.

* * * * *